May 28, 1929.                H. J. COCKS                1,715,336
                         ACCELERATOR FOOT REST
                          Filed June 20, 1928
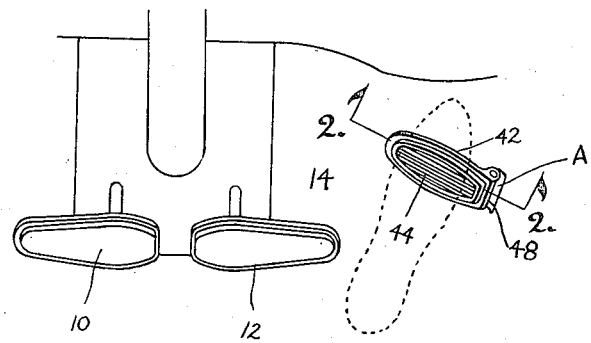
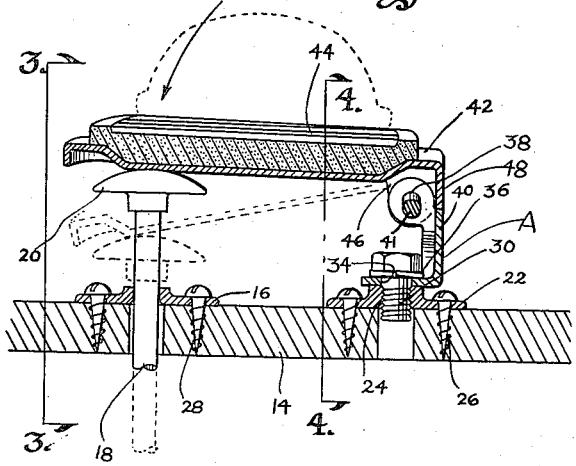
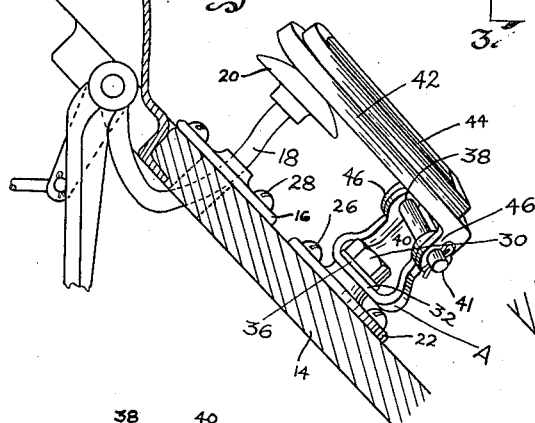
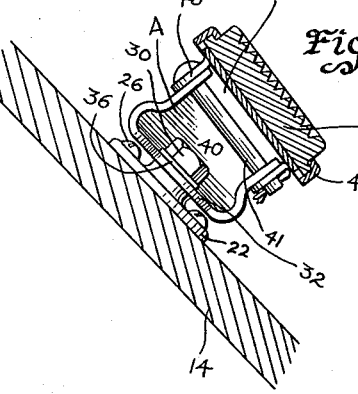
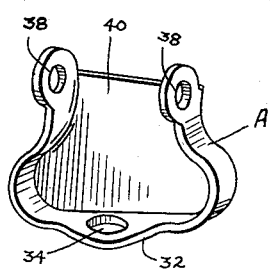
Witness
Solomon Betensky
Inventor
Harry J. Cocks
by Bair, Freeman & Sinclair
Attorneys Patented May 28, 1929.

1,715,336

UNITED STATES PATENT OFFICE.

HARRY J. COCKS, OF DES MOINES, IOWA, ASSIGNOR TO METAL PRODUCTS COMPANY, OF DES MOINES, IOWA.

ACCELERATOR FOOT REST.

Application filed June 20, 1928. Serial No. 286,994.

The object of my invention is to provide a foot rest for accelerators of simple, durable and comparatively inexpensive construction.

More particularly it is my object to provide a foot rest element adapted to coact with the present accelerator button so that movement of the foot rest will cause movement of the accelerator control button thus operating the accelerator of an automobile.

Still another object is to provide a single point of connection for the foot rest bracket whereby the foot rest element may be adjusted to various positions suitable for all driving conditions and different operators.

It may be here mentioned that upon many of the commercial automobiles of today, that adjacent the accelerator control button there is a rubber foot rest which is ordinarily mounted in a hub or base plate fixed to the floor boards of the automobile and it is my object to provide a foot rest elements having a bracket arranged to be connected by a single bolt to the normal base plate of the ordinary rubber foot rest after the foot rest has been removed.

Still a further object is to provide a pivoted foot rest element and a bracket so arranged that when the foot of the operator is adjacent the connection of the foot rest to the bracket, a substantially rigid foot rest is had and yet when the foot is twisted, the accelerator control will be operated as normally intended.

Still another object is to utilize the base plate now provided upon automobile floor boards for the foot rest so that the necessity of cutting the carpet or matting on the floor boards for the purpose of fastening brackets and the like thereto is entirely eliminated.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a plan view of my improved accelerator foot rest showing its position relative to the brake and clutch controls of the automobile and the position of the driver's foot being shown in dotted lines.

Figure 2 is a sectional view taken on the line 2—2 of Figure 1.

Figure 3 is a sectional view taken on the line 3—3 of Figure 2.

Figure 4 is a sectional view taken on the line 4—4 of Figure 2; and

Figure 5 is a perspective view of the bracket to which the foot rest element is connected.

In the accompanying drawings I have used the reference numeral 10 to indicate generally a clutch pedal control and 12 a brake pedal control. The particular style of pedal pads shown upon the bracket and clutch controls, is of the kind illustrated in my Letters Patent Number 1,595,710, issued August 10, 1926.

The floor boards 14 of an automobile are usually provided with a fitting 16 having an accelerator control rod 18 slidably mounted therethrough. An accelerator control button 20 is mounted in the upper end of the rod 18 and the button 20 is usually engaged by the foot for actuation of the accelerator proper. Spaced a short distance from the fitting 16 is a base plate 22 having a central screw threaded opening 24. The base plate is held in position by screws 26 and screws 28 are used for holding the fitting 16 in position.

It may be here mentioned that the foot rest of an ordinary type button having a threaded shank thereon is normally adapted to extend into the screw threaded opening 24 of the base plate 22. My entire foot rest assembly is adapted to be mounted upon the base plate 22 by a bolt or the like 30.

The foot rest assembly includes a bracket A having a base 32 arranged to rest upon the hub of the base plate 22. The base of the bracket A is provided with a central opening 34 through which the bolt or screw 30 extends. A lock washer 36 is interposed between the head of the bolt 30 and the bracket A. The bracket A may be adjusted to any position with the bolt 30 as an axis for such adjustment.

The bolt 30 serves as a single means of connection of the bracket A to the floor boards of the automobile. A pair of bearings 38 are formed on the bracket A and in the openings of the bearings, I extend a pintle rod 41. An upstanding back flange 40 is formed on the bracket A and gives rigidity to the entire bracket and at the same time, provides an upper edge which provides a stop for the foot rest element as will be more fully set forth.

The bracket A is formed of metal stampings and is of substantially the shape as shown in Figure 5 of the drawings. My foot rest element includes a metallic base or support 42 arranged with a rubber pad 44. The rubber pad 44 is mounted in the base 42 in the manner shown in my Letters Patent Number 1,595,710, issued August 10, 1926.

The base plate 42 has its underside resting upon the accelerator control button 20 and is in slidable engagement therewith although not permanently connected thereto. The base or support 42 includes a pair of downturned ears 46 which are arranged with registering openings to receive the pintle rod 41. The ears 46 project over the bearings 38 of the bracket A and the openings thereof are in register with the openings of the bracket A so that the pintle rod 41 when extended through provides a pivotal connection between the foot rest element and the bracket A.

The foot rest element includes a downwardly extending back flange 48 which reinforces the entire foot rest element and at the same time, is substantially in alignment with the flange 40 of the bracket A and the two adjacent edges abut each other when the parts are in position as shown in Figure 2 of the drawings, which position is the normal position of the parts before actuation of the foot accelerator.

The fact that the flanges 40 and 48 engage each other limits the amount of pivotal movement of the foot rest element in one direction and when the foot of the operator is shifted laterally and towards the pivotal connection, it enables the weight of the foot to be supported upon the portion of the foot rest adjacent the pintle rod and there is no accelerator control. The foot however, may be slid longitudinally toward the control button 20 or the foot may be twisted somewhat and thereupon the foot rest element will move upon its pivot and assume a position substantially as shown in dotted lines in Figure 2 of the drawings at which time the accelerator will be feeding gasoline.

It will be noted as clearly shown in Figure 4 of the drawings that the foot rest is arranged at an angle so that the foot may conveniently rest thereon with ease and comfort. In the assembly of my device upon the floor board of an automobile, it is only necessary to remove the ordinary rubber button rest and thereafter take the bracket A and connect it to the base plate 22 by means of the bolt 30.

The foot rest element is then positioned over the bracket A and connected thereto by the pintle rod 41 which completes the entire assembly of the device and the device is then ready for use.

It will be noted that the foot rest element is substantially elongated so that various drivers may use the same foot rest with ease of operation. It will be further noted that I utilize the connection now provided upon the floor boards of the automobile to mount my foot rest thereon and that thereafter, it is unnecessary to either secure additional fastening means or screws to the floor boards and that it is unnecessary to interfere with the present carpet or matting upon the floor board.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In combination with a plate secured to the floor of an automobile and having a screw threaded opening therein, an accelerator foot rest comprising a bracket, a cap screw extending through said bracket and into said opening whereby the bracket may be adjusted around said plate as a pivot, a pair of spaced bearings formed on said bracket, a pintle rod carried by said bearings and a foot rest element pivotally mounted on said pintle rod, said foot rest having its undersurface engaging the upper surface of an accelerator control button whereby pivotal movement of the foot rest on the pintle rod will operate the accelerator control button.

2. An accelerator foot rest comprising a bracket having a single point of connection with the floor boards of an automobile whereby the bracket may be adjusted around the point of connection, a pair of spaced bearings formed on said bracket, a pintle rod carried by said bearings and a foot rest element pivotally mounted on said pintle rod, said foot rest having its undersurface engaging the upper surface of an accelerator control button whereby pivotal movement of the foot rest will operate the accelerator control button, an upstanding back flange on said bracket, a corresponding downwardly extending back flange on said foot rest element, said flanges having their edges normally in engagement for preventing pivotal movement of the foot rest element in one direction, thereby providing a fixed portion upon which the foot may rest independently of the use of said foot rest as an accelerator control.

3. An accelerator foot rest comprising a bracket and a foot rest element pivotally mounted with respect to said bracket, said foot rest element engaging an accelerator control button whereby pivotal movement of the foot rest will operate the accelerator control button, an upstanding back flange on said bracket, a corresponding downwardly extending back flange on said foot rest element, said flanges having their edges normally in engagement for preventing pivotal movement of the foot rest element in one direction thereby providing a fixed portion upon which the foot rest may rest independently of the use of said foot rest as an accelerator control.

Des Moines, Iowa, May 16, 1928.

HARRY J. COCKS.